United States Patent Office 3,839,563
Patented Oct. 1, 1974

3,839,563
FUNGICIDAL O-ALKYL (-CYCLOALKYL)-S-ALKYL - O - HALOPHENYL-PHOSPHOROTHIOLATES
Toyohiko Kume and Shizuo Higashikawa, Tokyo, Japan, assignors to Bayer Aktiengesellschaft, Leverkusen, Germany
No Drawing. Original application June 3, 1969, Ser. No. 830,133, now Patent No. 3,663,665. Divided and this application Mar. 8, 1972, Ser. No. 232,965
Claims priority, application Japan, June 18, 1968, 43/41,619
Int. Cl. A01n 9/36
U.S. Cl. 422—225
17 Claims

ABSTRACT OF THE DISCLOSURE

O - alkyl(cycloalkyl)-S-alkyl-O-halophenyl-phosphorothiolates, i.e. O-alkyl and cycloalkyl-S-alkyl-O-chlorobromo-substituted-phenyl-phosphorothiolates or -thiolphosphates, which possess fungicidal properties are disclosed.

This application is a division of U.S. application Ser. No. 830,133, filed June 3, 1969 which is now U.S. Pat. No. 3,663,665.

The present invention relates to and has for its objects the provision for particular new O-alkyl(-cycloalkyl)-S-alkyl-O-halophenyl phosphorothiolates, i.e. O-alkyl and cycloalkyl-S-alkyl - O-chloro bromo-substituted-phenyl-phosphorothiolates or -thiolphosphates, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

Heretofore, in controlling serious rice diseases such as blast and sheath blight, organic mercury compounds and organic arsenic compounds such as phenyl mercuric acetate (A), methyl arsonic acid, salts, etc., which contain heavy metals harmful to man and cattle have been used widely, because they are excellent in their fungicidal effect and are comparatively economical to use. However, the use of organic mercuric compounds during the growing period of rice plants is objectionable from a public health standpoint because of the direct and indirect toxicity of these known compounds to mammals.

Accordingly, inexpensive and effective compounds which do not contain any heavy metals harmful to man and cattle are urgently needed to combat rice diseases.

It has now been found, in accordance with the present invention, that the particular new O-alkyl(-cycloalkyl)-S-alkyl-O-halo-phenyl-phosphorothiolates of the formula

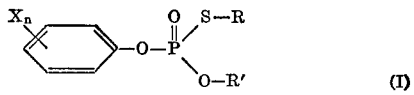
(I)

in which
R is alkyl of 1-4 carbon atoms,
R' is alkyl of 2-6 carbon atoms or cycloalkyl of 5-6 ring carbon atoms,
X is halo, and
n is a whole number from 3-5, especially 3-4
exhibit strong fungicidal properties.

In copending U.S. application Ser. No. 830,153, now U.S. Pat. No. 3,784,654 filed simultaneously herewith, corresponding to Japanese Application Sho 4,161,868 and of overlapping inventorship herewith, O-alkyl(-cycloalkyl)-S-alkyl-S-phenyl-phosphorodithiolates are disclosed and claimed which possess fungicidal properties.

It has been furthermore found, in accordance with the present invention, that a process for the production of the particular new compounds of formula (I) above may be provided, which comprises (a) reacting a thiolphosphoryl halide of the formula

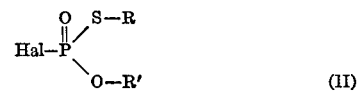
(II)

in which
R and R' are the same as defined above, and
Hal is a halogen atom such as chloro, bromo,
with a phenol of the formula

(III)

in which
X and n are the same as defined above, and
M is hydrogen or alkali metal such as sodium or potassium; or (b) reacting a phenyl-phosphorothiolate salt of the formula

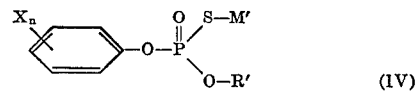
(IV)

in which
R', X and n are same as defined above, and
M' is alkali metal such as potassium, or ammonium, with an alkyl salt of the formula Y—R (V) in which R is the same as defined above, and
Y is halo or RSO₄—(wherein R is the same as defined above).

Surprisingly, the particular new phosphorothiolates of formula (I) above according to the present invention exhibit an excellent fungitoxic effectiveness, especially for agricultural and horticultural purposes, more especially against rice diseases, and a certain insecticidal effectiveness, with a comparatively low mammalian toxicity and a concomitantly low phytotoxicity, whereas the known organic mercury and organic arsenic compounds used for these purposes as aforesaid are highly toxic to mammals. Therefore, the instant compounds represent a valuable contribution to the art.

The general processes for the preparation of the instant compounds are illustrated by the following corresponding reaction schemes:

(a) 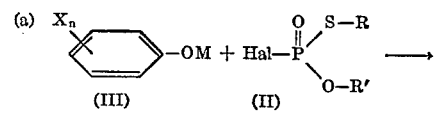

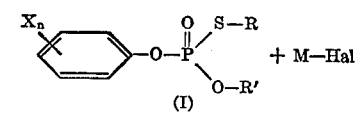

(b) 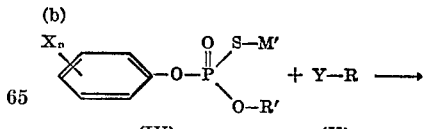

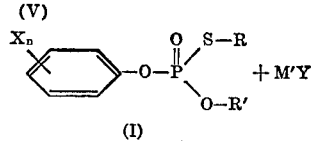

The starting materials to be used for producing the instant new compounds are already known and are clearly characterized by the corresponding formulae (II), (III), (IV) and (V) noted above.

Advantageously, in accordance with the present invention, in the various formulae herein:

R represents lower alkyl hydrocarbon of 1-4 carbon atoms such as methyl, ethyl, n- and iso- propyl, n-, iso-, sec.- and tert.- butyl, and the like, especially $C_{1-3}$ or $C_{1-2}$ alkyl;

R' represents lower alkyl hydrocarbon of 2-6 carbon atoms such as ethyl, n- and iso-propyl, n-, iso-, sec.- and tert.- butyl, n- and iso-amyl, n-and iso-hexyl, and the like, especially $C_{2-6}$ of $C_{3-6}$ or $C_{4-6}$ or $C_{2-4}$ alkyl; or cycloalkyl hydrocarbon of 5-6 ring carbon atoms such as cyclopentyl, cyclohexyl, and the like, especially cyclohexyl;

X represents halo such as chloro, bromo, fluoro and iodo, especially chloro and bromo;

n represents a whole number from 3 to 5, especially 3 to 4;

X, when n is 3 to 5, being in 2,3,4-, 2,3,5-, 2,3,6-, 2,4,5-, 2,4,6- or 3,4,5-tri; 2,3,4,5-, 2,3,4,6- or 2,3,5,6-tetra; and penta -halo (i.e. same or mixed -chloro, -bromo, -fluoro and/or -iodo) -position, i.e. on the phenyl nucleus;

Hal represents halo such as chloro, bromo, fluoro and iodo, especially chloro;

M represents hydrogen; or an alkali metal atom such as sodium, potassium, lithium, and the like, especially sodium and potassium;

M' represents an alkali metal atom as defined above, especially potassium; or an ammonium group; and Y represents halo as defined above, especially chloro; or $RSO_4^-$ wherein R is the same as defined above.

Preferably, R is $C_{1-2}$ alkyl; R' is $C_{2-4}$ alkyl or cyclohexyl; X is chloro or bromo; and n is 3–5 or 3–4; especially with X being the same halo when n is more than 3. Such compounds possess an excellent effect against serious rice diseases such as blast, brown spot and sheath blight.

As examples of thiolphosphoryl halides of formulae (II) above which may be used as starting materials, there are mentioned:

O-n-butyl-S-methyl, O-n-butyl-S-ethyl-, O-n-hexyl-S-ethyl- O-isopropyl-S-methyl-, O-isopropyl-S-ethyl-, O-ethyl-S-methyl, O-ethyl-S-ethyl-, O-cyclohexyl-S-methyl-, O-cyclohexyl-S-ethyl, and the like, thiolphosphoryl chlorides, bromides, etc.

As examples of phenols and corresponding alkali metal salts of formula (III) above which may be used as starting materials, there are mentioned:

2,3,4-, 2,3,5-, 2,3,6-, 2,4,5-, 2,4,6- and 3,4,5- tri-; 2,3,4,5-, 2,3,4,6-, and 2,3,5,6-tetra-; and penta-chloro, bromo, fluoro and/or iodo, especially chloro and bromo-substituted phenols, and the corresponding sodium and potassium phenates, and the like.

As examples of phenyl-phosphorothiolate salts of formula (IV) above which may be used as starting materials there are mentioned:

O-(ethyl, n-propyl, isopropyl, n-butyl, n-hexyl and cyclohexyl)-o- (2,3,4-, 2,3,5-, 2,3,6-, 2,4,5-, 2,4,6- and 3,4,5- tri-; 2,3,4,5-, 2,3,4,6- and 2,3,5,6- tetra-; and penta-chloro, bromo, fluoro and iodo- substituted phenyl)-phosphorothiolate-sodium, potassium and ammonium salts, and the like.

As examples of alkyl salts of formula (V) above which may be used as starting materials, there are mentioned:

methyl, ethyl, n-propyl, isopropyl, n-butyl, iso-butyl, sec.- butyl and tert.-butyl -chloride, -bromide, -fluoride and -iodide, and the like, and di-methyl, ethyl, n-propyl, isopropyl, n-butyl, iso-butyl, sec.-butyl and tert.-butyl-sulfate, and the like.

Suitable inert organic solvents usable for carrying out the production process in accordance with both reaction variant (a) and reaction variant (b) of the present invention include hydrocarbons, such as benzene and benzine; chlorinated hydrocarbons, such as methylene chloride, ethylene chloride, carbon tetrachloride and dichlorobenzene; alcohols such as methanol, ethanol, propanol and butanol; ethers, such as diethyl ether, dibutyl ether and dioxan; ketones, such as acetone, cyclohexanone and methylethyl ketone; and acetonitrile and dimethyl formamide; and the like.

The reaction temperature for both reaction variant (a) and reaction variant (b) can be varied within a fairly wide range. In general, the reaction is carried out at substantially between about 0–100° C., preferably between about 0–80° C.

A basic substance, preferably a tertiary amine, such as triethylamine, pyridine, dimethyl-cyclohexylamine, dimethylaniline and dimethylbenzylamine, is advantageously employed as acid binding agent where the corresponding free starting phenol is used according to reaction variant (a).

When carrying out the production process, approximately equimolar amounts of the starting reactants are used, but an excess of the acid binding agent is not harmful, i.e. where the free phenol is used according to reaction variant (a). An inert organic solvent such as benzene (e.g. reaction variant (a)) or ethanol (e.g. reaction variant (b)) may be employed and the reaction may be carried out, for example, in triethylamine as acid binding agent where the free starting phenol is used according to reaction variant (a). A temperature of about 0–80° C. may be used, and the reaction effected by dissolving the phenol and triethylamine in benzene and adding the thiolphosphoryl halide dropwise thereto according to reaction variant (a), or by dissolving the phenyl-phosphorothiolate salt in ethanol and adding the alkyl halide or alkyl sulfate thereto according to reaction variant (b).

After completion of the reaction (about 1–6 hours), the reaction mixture may be worked up in the usual manner, such as by washing the organic phase of the reaction mixture with water and thereafter with aqueous sodium carbonate solution and water, then drying with anhydrous sodium sulfate, and distilling off the benzene, e.g. according to reaction variant (a); or by filtering off the solids, distilling off the ethanol from the filtrate, dissolving the residue in benzene, washing with aqueous sodium carbonate solution, drying with anhydrous sodium sulfate, and distilling off the benzene, e.g. according to reaction variant (b). The residue is in most cases a colorless oil which is soluble in organic solvents and only slightly soluble in water.

Advantageously, the particular new active compounds according to the present invention exhibit strong fungitoxic activity and are distinguished by a broad spectrum of activity. Their low toxicity to warm-blooded animals and their good compatibility with higher plants permits the instant new compounds to be used as plant protection agents against fungal plant diseases. In the concentrations normally used for the control of fungi, the instant compounds do not damage cultivated plants.

Fungitoxic agents, such as the instant compounds, are usable in plant protection, i.e. agricultural and horticultural endeavors, for the control of fungi from the most diverse classes of fungi, such as *Archimycetes, Phycomycetes, Ascomycetes, Basidiomycetes,* and *Fungi Imperfecti*.

The particular new active compounds according to the present invention can be used for example against parasitic fungi, on above-the-soil parts of plants, fungi which cause tracheomycosis which attack the plant from the soil, seed-borne fungi and soil-inhabiting fungi.

By reason of their excellent properties mentioned above, the particular new active compounds according to the present invention can also be used with good results against fungal diseases which hitherto had to be controlled with fungicidal agents containing heavy metals harmful to man and cattle, e.g. arsenic and mercury.

The instant active compounds have given particularly good results in the control of serious rice diseases including not only rice blast and brown spot, but also sheath blight. Thus, the instant compounds show an excellent activity against the fungi *Piricularia oryzae* (i.e. blast), *Cochliobolus miyabeanus* (i.e. brown spot) and *Pellicularia sasakii* (i.e. sheath blight), as well as against the fungi *Mycosphaerella melonis* (cucumber) *Alternia kikuchiana* (pear), *Elsinoe ampeliva* (grape), and the like.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and non-solvents, such as aromatic hydrocarbons (e.g. benzene, toluene, xylene, dimethyl naphthalene, aromatic naphthas, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol. ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, ii.e. calcium carbonate, talc, kieselguhr, diatomaceous earth clay, montomorillonite, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying or wetting agents, such as non-ionic and/or anionic emulsifying or wetting agent (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plants protection agents, such as other fungicides, or herbicides, insecticides, acaricides, nematocides, bactericides, etc., including, especially organo-phosphorus compounds, chlorine compounds, compounds, dithiocarbamate compounds, chlorine compounds, dinitro compounds, organic sulfur or copper compounds, substituted phenoxy compounds, chlorophenols, substituted diphenyl ethers, anilide compounds, ureas, triazines, antibiotics, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–10%, preferably 0.05–5%, by weight of the mixture. Thus, the present invention contemplates overall compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.05–95%, by weight of the mixture.

Generally, the active compound is used in dosage amounts per unit area of substantially between about 15–1000 preferably 40–600 and most preferably 40–100, per 10 acres, irrespective of the presence or absence of such carrier vehicle.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns; or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound, or even the 100% active substance alone, e.g. about 20–100% by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting watering, sprinkling, pouring, dressing, via incrustation, and the like.

Significantly, the fungicidal compositions of the present invention can be applied for example by spraying a dust formulation directly onto stems and leaves of plants; or by using the formulation for seed-dressing; by spraying an emulsifiable concentrate, diluted with water, etc. to a desirable concentration, onto stems and leaves of plants; by suspending a wettable powder in water at a desirable concentration and spraying the formulation onto stems and leaves of plants; by applying granule formulations to soil; and the like.

It will be realized, of course, that the concentration of the particular active compound utilized in admixture with the carrier vehicle will depend upon the intended application, the purpose for which the active compound is used, and the like. Therefore, in special cases, it is possible to go above or below the aforementioned concentration ranges and dosage amounts per unit area.

The following illustrate, without limitation, examples of formulations which may be used in accordance with the present invention:

FORMULATION A 15 parts of instant compound (11), 80 parts of a mixture of diatomaceous earth and kaolin (1:5) and 5 parts of the emulsifier Runox (trade name of the product of Toho Kagaku Kogyo K.K., Japan: polyoxyethylenealkylarylether) are formulated into a wettable powder by crushing and mixing. It is diluted with water at the concentration of 1 to 300~500 and applied by spraying to the phytopathogenic fungi and/or their habitat.

FORMULATION B 30 parts of instant compound (3), 30 parts of xylene and 30 parts of Kawakazol (trade name of the product of Kawasaki Kasei Kogyo K. K., Japan: aromatic hydrocarbons of high boiling point) and 10 parts of the emulsifier Sorpol (trade name of the product of Toho Kagaku Kogyo K. K., Japan: polyoxyethylenealkylarylether) are formulated into an emulsifiable concentrate by mixing and stirring. It is diluted with water to the concentration of 1 to 1000 and applied by spraying to the phytopathogenic fungi and/or their habitat.

FORMULATION C 2 parts of instant compound (8) and 98 parts of a mixture of talc and clay (3:1) are formulated into a dust by crushing and mixing. It is applied as is by dusting to the phytopathogenic fungi and/or their habitat.

FORMULATION D 1.5 parts of instant compound (11), 1.5 parts of O-ethyl-S,S-diphenyl-phosphorodithiolate, and 97 parts of a mixture of talc and clay (3:1) are formulated into a dust by crushing and mixing. It is applied in the same manner described in Formulation C.

The fungicidal effectiveness of the particular new compounds of the present invention is illustrated without limitation, by the following Examples:

EXAMPLE 1

(i) Test against rice blast/(*Piricularia oryzae*) (Pot test)

Paddy rice (Jukkoku variety) was cultivated in pots of 12 cm. in diameter and the diluted aqueous solution of the particular active compound in the formulation of wettable powder as described in Formulation A was sprayed on the rice plants at their young ear forming stage until leaves of rice plants became dripping wet. On the next day the sprayed (i.e. treated) rice plants were placed in a moisture chamber and kept there under conditions of the relative humidity of 100% at the temperature of 25° C. for 48 hours. During that time a spore suspension of rice blast (*Piricularia oryzae*) pathogen was sprayed onto two time for inoculation. After the inoculated rice plants were kept under such conditions for 7 days, the disease attack rate, i.e. infestation, per pot was evaluated and classified according to the rating from 0 to 5, and the controlling value against blast was calculated from the following formula:

| Disease attack rate (Infestation) | Percentage of disease-spot area, Percent |
|---|---|
| 0 | 0 |
| 0.5 | <2 |
| 1 | 3~5 |
| 2 | 6~10 |
| 3 | 11~20 |
| 4 | 21~40 |
| 5 | 40 |

$$\text{Controlling value} = \frac{\text{Infestation in non-treated plot} - \text{I. in treated plot}}{\text{Infestation in non-treated plot}} \times 100$$

The particular active compounds tested, their concentrations and the results obtained (rate of attack on the basis of the mean value of 5 plots per compound tested) can be seen from the following Table 1.

TABLE 1.—TEST RESULTS OF FUNGICIDAL EFFECT AGAINST RICE BLAST

| Active compound No. | Concentration of active compound in p.p.m. | Infestation | Controlling value | Phytotoxicity |
|---|---|---|---|---|
| Compound of invention: | | | | |
| (1₁) | 500 | 1.9 | 62 | |
| (2₁) | 500 | 1.2 | 76 | |
| (3₁) | 250 | 0.9 | 82 | |
| (4₁) | 500 | 2.2 | 56 | |
| (5₁) | 500 | 1.5 | 70 | |
| (6₁) | 500 | 2.2 | 56 | |
| (7₁) | 500 | 2.2 | 56 | |
| (8₁) | 250 | 1.0 | 80 | |
| (9₁) | 500 | 2.0 | 60 | |
| (10₁) | 500 | 1.4 | 72 | |
| (11₁) | 250 | 0.7 | 86 | |
| (12₁) | 500 | 2.2 | 56 | |
| (13₁) | 500 | 1.6 | 68 | |
| (14₁) | 500 | 2.2 | 56 | |
| (15₁) | 500 | 2.5 | 50 | |
| O-n-butyl-S-ethyl-O-phenyl phosphorothiolate (comparison) | 500 | 4.7 | 6 | |
| Known compound comparison: | | | | |
| (A) PMA (phenylmercuric acetate) | 20 | 1.6 | 68 | |
| O-ethyl-S-ethyl-O-(4-chlorophenyl)-phosphorothiolate | 500 | 4.3 | 14 | |
| O-methyl-S-methyl-O-(2,4-dichlorophenyl)-phosphorothiolate | 500 | 4.5 | 10 | |
| Control | | 5.0 | 0 | |

NOTE.—Compounds of invention have corresponding numbers to those of Table 3 and Example 3 below, as the case may be.

EXAMPLE 2

Test against plant pathogens (Agar dilution method)

The particular active compound is mixed in an agar culture medium of potato to form the desired concentration of active compound therein. After the medium is poured into Petri dishes of 9 cm. in diameter and coagulated, the same are inoculated with the corresponding plant pathogens, Standard Petri dishes to which the active compound of Zineb (zinc-ethylene bis-dithiocarbamate) preparations are added are also set up. After having been cultured at 27° C. for 4 days, the growth condition of the plant pathogens is investigated and the minimum concentration of the active compound (in p.p.m.) for growth inhibition is determined.

The particular active compounds tested and the results obtained (i.e. the minimum concentration in p.p.m. for growth inhibition) can be seen from the following Table 2.

TABLE 2.—TEST RESULT OF FUNGICIDAL EFFECT AGAINST VARIOUS PLANT PATHOGENS

[Agar dilution method]

| Active compound No. | Piricularia oryzae (rice) | Cochliobolus miyabeanus (rice) | Pellicularia sasakii (rice) | Alternaria kikuchiana (pear) | Elsinoe ampelina (grape) |
|---|---|---|---|---|---|
| (1₂) | 20 | 50 | 100 | 50 | 50 |
| (2₂) | 20 | 50 | 100 | 50 | 50 |
| (3₂) | 20 | 25 | 100 | 25 | 50 |
| (4₂) | 20 | 50 | 100 | 50 | 50 |
| (5₂) | 10 | 50 | 100 | 50 | 50 |
| (6₂) | 20 | 50 | >100 | 100 | 50 |
| (7₂) | 20 | 50 | >100 | 100 | 50 |
| (8₂) | 20 | 50 | | 50 | 50 |
| (9₂) | 50 | 50 | >100 | 50 | 50 |
| (10₂) | 10 | 100 | | 50 | 100 |
| (11₂) | 20 | 25 | 100 | 100 | 50 |
| (12₂) | 20 | 50 | | 50 | 100 |
| (13₂) | 20 | 50 | | 100 | 100 |
| (14₂) | 20 | 25 | >100 | 100 | 100 |
| Zineb¹ | 50 | 200 | 100 | 200 | 200 |

¹ Standard.

NOTE.—Compounds of invention have corresponding numbers to those of Table 3 below, as the case may be.

The following further examples illustrate, without limitation, the process for producing the particular new compounds of the present invention.

EXAMPLE 3

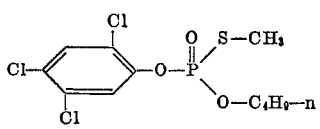

(3₁)

20 g. of 2,4,5-trichloro-phenol and 10.3 g. of triethylamine are dissolved in 300 ml. of benzene. To this solution, 20 g. of O-n-butyl-S-methyl-thiophosphoryl-chloride (b.p. 72° C./0.2 mm. Hg) are added dropwise while cooling. After the completion of the addition, the mixture is stirred for 5 hours at 60° C. and then the reaction mixture is cooled. The organic layer is washed with water and then with 1% sodium carbonate solution and water and thereafter dehydrated over anhydrous sodium sulfate. Upon distilling off the benzene present and then distilling the residue further, 31 g. of colorless oily O-n-butyl-S-methyl-O-(2,4,5-trichlorophenyl)-phosphorothiolate, b.p. 165–167° C./0.2 mm. Hg, are obtained.

O - n - butyl-S-ethyl-O-(2,4,6-tribromo-phenyl)-phosphorothiolate (15₁) with similar fungicidal activity is also obtainable in analogous manner.

EXAMPLE 4

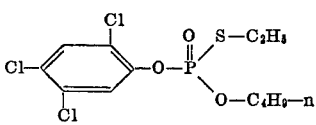

(11₁)

39 g. of the potassium salt of O-n-butyl-O-(2,4,5-trichloro-phenyl)-phosphorothiolate are dissolved in 200 ml. of ethyl alcohol. To this solution, 11 g. of ethylbromide are added and the mixture is stirred for 4 hours at 60° C. After the reaction mixture has cooled, the formed precipitate is separated by filtration and the solvent of the filtrate is distilled off. The remaining concentrated residue is then dissolved in benzene. The benzene solution is thereafter washed with 1% aqueous solution of sodium carbonate and dehydrated over anhydrous sodium sulfate. Upon distilling off the benzene present and further distilling the residue, 35 g. of colorless oily O - n-butyl-S-ethyl-O-(2,4,5-trichlorophenyl)-phosphorothiolate, b.p. 168–170° C./0.1 mm. Hg, are obtained.

According to the same process, when the corresponding potassium salt of O-n-butyl-O-(2,4,6-tribromo-phenyl)-phosphorothiolate is reacted instead of the potassium salt of O-n-butyl-O-(2,4,5-trichloro-phenyl)-phosphorothiolate, the corresponding O-n-butyl-S-ethyl-O-halogenophenyl-phosphorothiolate with similar fungicidal activity is obtained, i.e.:

(15₂)     O-n-butyl-S-ethyl-O-(2,4,6-tribromo-phenyl)-phosphorothiolate

The following Table 3 illustrates appropriate data for typical compounds of the present invention.

TABLE 3

| Compound | Structural formula | Physical properties |
|---|---|---|
| (1₃) | Cl-C₆H₂(Cl)(Cl)-O-P(=O)(S-CH₃)(O-C₂H₅) | B.P. 148–150° C./0.1 mm. Hg |
| (2₃) | Cl-C₆H₂(Cl)(Cl)-O-P(=O)(S-CH₃)(O-C₃H₇-i) | B.P. 150–155° C./0.1 mm. Hg |
| (3₃) | Cl-C₆H₂(Cl)(Cl)-O-P(=O)(S-CH₃)(O-C₄H₉-n) | B.P. 165–167° C./0.2 mm. Hg |
| (4₃) | Cl-C₆H₂(Cl)(Cl)-O-P(=O)(S-CH₃)(O-C₄H₉-n) | B.P. 166–170° C./0.2 mm. Hg |
| (5₃) | Cl-C₆H₂(Cl)(Cl)-O-P(=O)(S-CH₃)(O-C₄H₉-n) | $n_D^{20}=1.5656$ |
| (6₃) | Cl-C₆H₂(Cl)(Cl)-O-P(=O)(S-C₂H₅)(O-C₂H₅) | B.P. 150–156° C./0.2 mm. Hg |
| (7₃) | Cl-C₆H₂(Cl)(Cl)-O-P(=O)(S-C₂H₅)(O-C₂H₅) | $n_D^{20}=1.5754$ |
| (8₃) | Cl-C₆H₂(Cl)(Cl)-O-P(=O)(S-C₂H₅)(O-C₃H₇-i) | B.P. 164–165° C. 0.1 mm. Hg |
| (9₃) | Cl-C₆H₂(Cl)(Cl)-O-P(=O)(S-C₂H₅)(O-C₃H₇-i) | B.P. 167–170° C. 0.2 mm. Hg |
| (10₃) | Cl-C₆H₂(Cl)(Cl)-O-P(=O)(S-C₂H₅)(O-C₃H₇-i) | $n_D^{20}=1.5602$ |
| (11₃) | Cl-C₆H₂(Cl)(Cl)-O-P(=O)(S-C₂H₅)(O-C₄H₉-n) | B.P. 168–170° C. 0.1 mm. Hg |
| (12₃) | Cl-C₆H₂(Cl)(Cl)-O-P(=O)(S-C₂H₅)(O-C₄H₉-n) | B.P. 170–175° C. 0.2 mm. Hg |
| (13₃) | Cl-C₆H₂(Cl)(Cl)-O-P(=O)(S-C₂H₅)(O-C₄H₉-n) | $n_D^{20}=1.5506$ |
| (14₃) | Cl-C₆H₂(Cl)(Cl)-O-P(=O)(S-C₂H₅)(O-C₆H₁₁) | $n_D^{20}=1.5546$ |
| (15₃) | Br-C₆H₂(Br)(Br)-O-P(=O)(S-C₂H₅)(O-C₄H₉-n) | $n_D^{20}=1.5864$ |

These compounds may be designated:

(1) O-ethyl-S-methyl-O-(2,4,5-trichloro-phenyl)-phosphorothiolate
(2) O-isopropyl-S-methyl-O-(2,4,5-trichloro-phenyl)-phosphorothiolate
(3) O-n-butyl-S-methyl-O-(2,4,5-trichloro-phenyl)-phosphorothiolate
(4) O-n-butyl-S-methyl-O-(2,4,6-trichloro-phenyl)-phosphorothiolate
(5) O-n-butyl-S-methyl-O-(2,3,4,6-tetrachloro-phenyl)-phosphorothiolate
(6) O-ethyl-S-ethyl-O-(2,4,5-trichloro-phenyl)-phosphorothiolate
(7) O-ethyl-S-ethyl-O-(2,3,4,6-tetrachloro-phenyl)-phosphorothiolate
(8) O-isopropyl-S-ethyl-O-(2,4,5-trichloro-phenyl)-phosphorothiolate
(9) O-isopropyl-S-ethyl-O-(2,4,6-trichloro-phenyl)-phosphorothiolate
(10) O-isopropyl-S-ethyl-O-(2,3,4,6-tetrachloro-phenyl)-phosphorothiolate
(11) O-n-butyl-S-ethyl-O-(2,4,5-trichloro-phenyl)-phosphorothiolate
(12) O-n-butyl-S-ethyl-O-(2,4,6-trichloro-phenyl)-phosphorothiolate
(13) O-n-butyl-S-ethyl-O-(2,3,4,6-tetrachloro-phenyl)-phosphorothiolate
(14) O-cyclohexyl-S-ethyl-O-(2,4,5-trichloro-phenyl)-phosphorothiolate
(15) O-n-butyl-S-ethyl-O-(2,4,6-tribromo-phenyl)-phosphorothiolate It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and higher plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. A method of killing the fungus Pirricularia oryzae, which comprises applying to at least one of (a) said fungus or (b) its habitat, a fungicidally effective amount of a compound of the formula

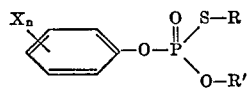

in which R is alkyl of 1–2 carbon atoms, R' is selected from the group consisting of alkyl of 2–4 carbon atoms and cyclohexyl, X is chloro or bromo, and $n$ is a whole number from 3–4.

2. The method of claim 1 wherein the compound is O - ethyl - S-methyl-O-(2,4,5-trichloro-phenyl)-phosphorothiolate of the formula

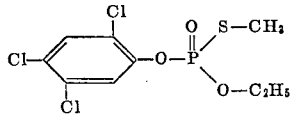

3. The method of claim 1 wherein the compound is O-isopropyl - S - methyl-O-(2,4,5-trichloro-phenyl)-phosphorothiolate of the formula

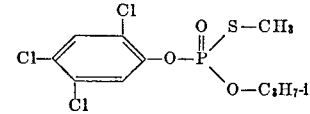

4. The method of claim 1 wherein the compound is O - n - butyl-S-methyl-O-(2,4,5-trichloro-phenyl)-phosphorothiolate of the formula

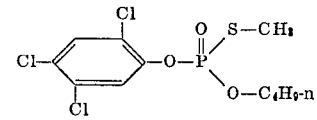

5. The method of claim 1 wherein the compound is O - n - butyl - S-methyl-O-(2,3,4,6-tetrachloro-phenyl)-phosphorothiolate of the formula

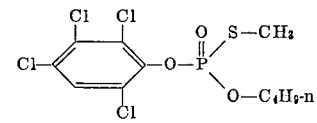

6. The method of claim 1 wherein the compound is O - iso - propyl-S-ethyl-O-(2,4,5-trichlorophenyl)-phosphorothiolate of the formula

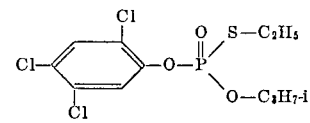

7. The method of claim 1 wherein the compound is O - iso - propyl-S-ethyl-O-(2,4,6-trichlorophenyl)-phosphorothiolate of the formula

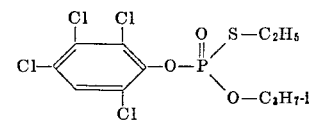

8. The method of claim 1 wherein the compound is O - iso - propyl - S-ethyl-O-(2,3,4,6-tetrachloro-phenyl)-phosphorothiolate of the formula

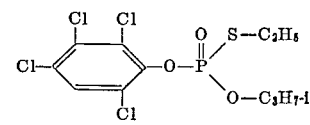

9. The method of claim 1 wherein the compound is O - n-butyl-S-ethyl-O-(2,4,5-trichloro-phenyl)-phosphorothiolate of the formula

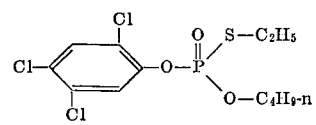

10. The method of claim 1 wherein the compound is O - n - butyl-S-ethyl-O-(2,3,4,6-tetrachloro-phenyl)-phosphorothiolate of the formula

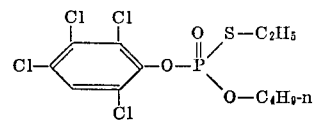

11. The method of claim 1 wherein the compound is O - cyclohexyl - S-ethyl-O-(2,4,5-trichloro-phenyl)-phosphorothiolate of the formula

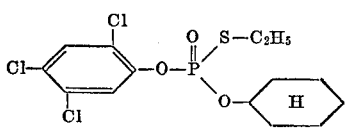

12. The method of claim 1 wherein the compound is O - n-butyl-S-ethyl-O-(2,4,6-tribromo-phenyl)-phosphorothiolate of the formula

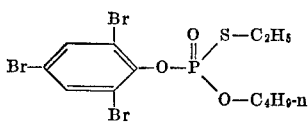

13. The method of claim 1 wherein the compound is used in the form of a mixture with a dispersible carrier vehicle, said compound being present in an amount of about 0.001–95% by weight of the mixture.

14. The method of claim 1 wherein the compound is applied in an amount of about 15 to 1000 grams per 10 ares.

15. A fungicidal composition used to control rice blast comprising a fungicidally effective amount of a compound of the formula

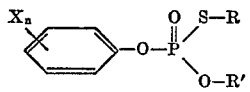

in which R is alkyl of 1–2 carbon atoms, R' is selected from the group consisting of alkyl of 2–4 carbon atoms and cyclohexyl, X is chloro or bromo, and $n$ is a whole number from 3–4 in admixture with a diluent.

16. The composition of claim 15 wherein the compound is selected from the group consisting of:

O-ethyl-S-methyl-O-(2,4,5-trichloro-phenyl)-phosphorothiolate,
O-isopropyl-S-methyl-(2,4,5-trichloro-phenyl)-phosphorothiolate,
O-n-butyl-S-methyl-O-(2,4,5-trichloro-phenyl)-phosphorothiolate,
O-n-butyl-S-methyl-O-(2,3,4,6-tetrachloro-phenyl)-phosphorothiolate,
O-isopropyl-S-ethyl-O-(2,4,5-trichloro-phenyl)-phosphorothiolate,
O-isopropyl-S-ethyl-O-(2,4,6-trichloro-phenyl)-phosphorothiolate,
O-iso-propyl-S-ethyl-O-(2,3,4,6-tetrachloro-phenyl)-phosphorothiolate,
O-n-butyl-S-ethyl-O-(2,4,5-trichloro-phenyl)-phosphorothiolate,
O-n-butyl-S-ethyl-O-(2,3,4,6-tetrachloro-phenyl)-phosphorothiolate,
O-cyclohexyl-S-ethyl-O-(2,4,5-trichloro-phenyl)-phosphorothiolate and
O-n-butyl-S-ethyl-O-(2,4,6-tribromo-phenyl)-phosphorothiolate.

17. The composition of claim 15 wherein the diluent is a dispersible carrier vehicle and the compound is present in about 0.001 to 95% of the mixture.

References Cited
UNITED STATES PATENTS

| | | | |
|---|---|---|---|
| 3,309,371 | 3/1967 | Curry et al. | 260—964 |
| 3,468,984 | 9/1969 | Beriwer | 260—964 |
| 3,663,665 | 5/1972 | Kume et al. | 260—958 |
| 3,201,444 | 8/1965 | Schrader | 260—461 |
| 3,227,610 | 1/1966 | Sehring et al. | 424—225 |
| 3,269,894 | 8/1966 | Fetzer et al. | 424—225 X |

ALBERT T. MEYERS, Primary Examiner

L. SCHENKMAN, Assistant Examiner

UNITED STATES PATENT OFFICE
CERTIFICATE OF CORRECTION

Patent No. 3,839,563      Dated October 1, 1974

Inventor(s) TOYOHIKO HUME ET AL

It is certified that error appears in the above-identified patent and that said Letters Patent are hereby corrected as shown below:

Col. 1, line 12 (Priority document number), cancel "43/41,619" and substitute -- 41619/69 --.

Col. 1, line 68, cancel "4,161,868" and substitute -- 41618/68 --.

Col. 5, line 64, cancel "plant" and substitute -- plants --.

Col. 5, line 67, cancel "compounds," second occurrence.

Col. 10, Table 3, Compound ($10_3$), cancel the formula and substitute

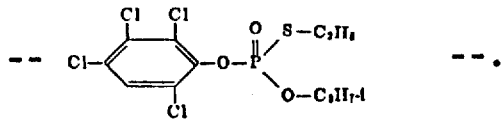

Col. 10, Table 3, Compound ($15_3$), in the formula, delete the bond " - " between "O" and "S-$C_2H_5$".

Col. 12, claim 7, cancel the structural formula and substitute

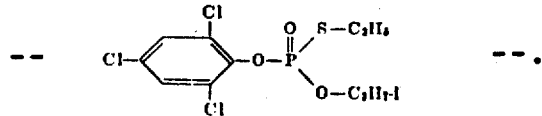

Signed and sealed this 18th day of April 1975.

(SEAL)
Attest:

RUTH C. MASON
Attesting Officer

C. MARSHALL DANN
Commissioner of Patents
and Trademarks